C. G. CURTIS.
ELASTIC FLUID TURBINE.
APPLICATION FILED JAN. 19, 1898.

985,885.

Patented Mar. 7, 1911.
5 SHEETS—SHEET 1.

WITNESSES:
H. W. Lloyd
C. E. Ashley

INVENTOR:
Charles G. Curtis,
By his Attorney
Rich'd N. Dyer.

C. G. CURTIS.
ELASTIC FLUID TURBINE.
APPLICATION FILED JAN. 19, 1898.

985,885.

Patented Mar. 7, 1911.
5 SHEETS—SHEET 2.

WITNESSES:
H. W. Lloyd
C. E. Ashley

INVENTOR:
Charles G. Curtis
By his Attorney
Rich N. Dyer

C. G. CURTIS.
ELASTIC FLUID TURBINE.
APPLICATION FILED JAN. 19, 1898.

985,885.

Patented Mar. 7, 1911.
5 SHEETS—SHEET 3.

WITNESSES:
H. W. Lloyd
C. E. Ashley

INVENTOR:
Charles G. Curtis
By his Attorney
Rich'd N. Dyer

C. G. CURTIS.
ELASTIC FLUID TURBINE.
APPLICATION FILED JAN. 19, 1898.

985,885.

Patented Mar. 7, 1911.
5 SHEETS—SHEET 4.

WITNESSES:
H. W. Lloyd
C. E. Ashley

INVENTOR:
Charles G. Curtis
By his Attorney

C. G. CURTIS.
ELASTIC FLUID TURBINE.
APPLICATION FILED JAN. 19, 1898.

985,885.

Patented Mar. 7, 1911.
5 SHEETS—SHEET 5.

WITNESSES:
H. W. Lloyd
C. E. Ashley

INVENTOR:
Charles G. Curtis
By his Attorney
Rich. N. Dyer.

UNITED STATES PATENT OFFICE.

CHARLES G. CURTIS, OF NEW YORK, N. Y., ASSIGNOR, BY MESNE ASSIGNMENTS, TO GENERAL ELECTRIC COMPANY, A CORPORATION OF NEW YORK.

ELASTIC-FLUID TURBINE.

985,885.  Specification of Letters Patent.  Patented Mar. 7, 1911.

Application filed January 19, 1898. Serial No. 667,144.

*To all whom it may concern:*

Be it known that I, CHARLES G. CURTIS, a citizen of the United States, residing at New York city, in the county and State of New York, have invented a certain new and useful Improvement in Elastic-Fluid Turbines, of which the following is a specification.

The object I have in view is to produce an apparatus for converting the energy of steam or other elastic fluid into mechanical rotation, with a greater efficiency than has heretofore been obtained.

An elastic fluid may contain energy in the form of pressure or of *vis viva*, and under proper conditions may be delivered to a turbine wheel by a nozzle as a stream with any desired portion of its original energy converted into *vis viva*, within certain limits. If the flow of the steam through the working passage of the turbine is accompanied by a stress upon surfaces thereof properly arranged and designed, mechanical rotation of the apparatus and utilization of the fluid's energy will be had. Heretofore this result has been attained by making the movable elements of the working passage in the form of a curve concave toward the direction of rotation, and the centrifugal force of the particles (as the direction of their flow has thereby been changed) has been relied upon to cause the desired rotative stress or driving effort. In water turbines this method of utilizing the *vis viva* of the stream is very satisfactory, the power developed on the shaft being a very large percentage of the amount which theory would indicate as possible in view of the angles, velocities, etc., while in steam or other elastic fluid turbines a much smaller percentage of the corresponding amount has heretofore been obtained. This is believed to be due in part at least, to the current misconception that an elastic fluid having a considerable *vis viva* may be treated as water, an inelastic fluid, and utilized in a turbine in the manner which has been found satisfactory in water turbine practice.

Comparing a reciprocating steam engine and a steam turbine, the cylinder wall losses as well as the mechanical friction of the one are substantially eliminated in the other, and there appears to be no sufficient reason why a properly designed steam turbine should not be a much more efficient utilizer of steam energy than a reciprocating engine. One reason, at least, for the failure to obtain the very greatly improved economy referred to, is believed to be due to the failure heretofore to provide for the steam or elastic fluid, a working passage adapted to the nature of the fluid.

An incompressible fluid, entering a curved vane passage at any given velocity, flows through it in a stream of uniform density, and sweeping around its curve under like conditions, will maintain a stress upon the concave walls, each layer of particles pressing upon but not compressing the layer adjacent to it toward the concavity, and will issue therefrom in a solid stream of uniform and unchanged density (except as friction may cause eddies), but at a reduced absolute velocity. An elastic fluid entering such a passage at an enormously higher velocity and undergoing a change of direction of flow, will exert a stress by centrifugal force at the points of change, but as the fluid is compressible, the stress of each layer of fluid upon the layer adjacent to it will compress the latter, and the density of the stream will no longer be uniform over any given cross-section. It will be greater at the concave surface where the rotative stress is exerted on the wall of the passage, and least at the edge of the stream farthest removed therefrom. An analysis of this phenomenon of centrifugal compression shows that the compression can only be obtained by a conversion of *vis viva* into pressure; or in other words, by a sacrifice of the velocity of flow and under conditions such as would be found in practical cases, the energy thus transformed into pressure is a very considerable portion of the total energy in the fluid. These facts have not been appreciated heretofore, and the buckets or vane passages of elastic fluid turbines have been heretofore designed to operate on the same general principles in this respect as those of water turbines. This is a serious mistake since the *vis viva* thus necessarily converted into pressure may readily be wasted by reexpansion of the fluid under conditions not adapted to insure the due restoration of *vis viva* and unless the due restoration of *vis viva* and utilization thereof is had, the efficiency of the turbine is unnecessarily reduced.

As usually designed for use with an elastic fluid, the curved vane passage of water turbine practice has from this point of view peculiar advantages. The centrifugal stress causing rotation is all upon one side of the passage, and the compression thus localized is great, while the conservation of this pressure and the due restoration of *vis viva* thereafter is, if not impossible, at least, attended with unnecessary difficulty. The tendency to eddy currents and frictional retardation is also great, and the unnecessarily large variation in density over any given cross-sectional area complexifies the whole problem.

I have devised a new principle of bucket action applicable to an elastic fluid whereby a stream of such fluid may be used in a working passage so as to exert a rotative stress upon moving surfaces forming part of such passage, and in such a way as to largely conserve the energy which the maintenance of this stress converts into pressure, and make it available for use thereafter. I have found that the energy of an elastic fluid entering at a given velocity a converging sided passage, or one having a gradually diminishing cross-sectional area, will undergo conversion from *vis viva* into pressure without substantial choking (or change in the quantity flowing per second), provided the contraction of the passage is not too great, and the fluid will be found at the successive cross-sections at the pressures, volumes and velocities corresponding to such conversion. If such a passage is free to move in the direction of the flow of the fluid, the stress upon the converging walls will drive it forward. This principle of bucket action may be superimposed upon the old principle of such action by centrifugal force on a curve, but in its more simple or elementary form, it consists in delivering the stream of fluids, (preferably at a high velocity and low pressure) into a movable vane element, forming the whole or a part of the working passage, and whose axial line in its anterior portion is that of the fluid's direction of flow. Two or more of the walls of this portion, however, converge, decreasing the cross-sectional area in the direction of flow to a minimum cross-section sufficient to carry the fluid, without choking, at the volume and the velocity corresponding to a pressure equal to that which the virtual *vis viva* is capable of causing in such a passage without substantial interruption of flow. In this converging anterior portion the *vis viva* with which the fluid entered the passage is largely reconverted into pressure, its passage from point to point being attended by progressive decline in velocity and increase in pressure. The axial line of this anterior portion of the movable element being at an acute angle to the direction of rotation, any stress exerted upon the converging surfaces thereof will tend to rotate the apparatus. The fluid, delivered in this way to the passage, impinges upon converging opposing surfaces and the rotative stress is thus had, not on one curved surface only, but on two or more sides of the stream and under conditions insuring its more uniform density, and a certain recovery of the energy converted into pressure so that it may thereafter be utilized. The rate of flow at each point will be the same, the cross-sectional area at all points being such as to carry the weight of fluid delivered per second to the passage, at the velocities, volumes and pressures at the several points. The fluid might issue from the movable element into the exhaust, or into a stationary element at this point, but this is not the preferable plan, nor would the whole principle of bucket action thus be shown. Regarding the description so far as relating to the bucket action in the anterior portion of the movable element, what follows relates to the bucket action in the middle and posterior portion of the movable element.

The fluid enters the middle portion through the funnel throat of the anterior portion under a desired pressure (but not exceeding the maximum as indicated) and at a corresponding velocity and volume, the velocity being however relatively low in any case. The middle portion may be either a curved passage adapted to turn the stream through the desired change of angle at a relatively low velocity, subjected to a relatively small centrifugal compression, frictional retardation, and eddy currents, or the stream may enter an enlarged chamber, in which substantially all of its remaining *vis viva* will be converted into pressure. In either case the outlet for the fluid, whether from such curved portion or from such enlarged chamber, will be through a posterior portion of the movable element whose first cross-sectional area will be such as to carry the fluid or permit its escape at the pressure, volume and velocity there existing. This posterior portion will preferably have walls diverging in the direction of flow and an axial angle as obtuse as possible to the plane of rotation, and at any rate such as that the largest cross-sectional area of the posterior portion shall be in the general direction opposite to that of rotation. In this posterior portion of the movable element the fluid will expand and have its remaining energy converted into *vis viva* to the extent permitted by the increase of cross-sectional area of the passage, its flow from point to point being accompanied by a progressive increase of velocity and decline in pressure. As in the anterior portion, so in this posterior portion the stress upon surfaces converging toward the direction of rotation will be a rotative stress whereby the energy of the fluid will be converted into mechanical power. While I prefer to produce the maximum conversion of *vis viva* into pressure in the anterior portion of the vane space, any degree of such conversion is advantageous, and is within the scope of my present invention. At the discharge end of this posterior portion of the movable element, the fluid should preferably be at a low pressure and high virtual velocity. If not then discharged into the exhaust, it will be received by an oppositely rotating element or into a stationary element and, after having its direction of flow changed, be delivered to a subsequent element, etc. The number of elements may be few or many in number according to their peripheral speed and the degree of efficiency desired. My invention is also applicable to a stationary intermediate element in the working passage in which the fluid's direction of flow is changed. Such change being necessarily accompanied by compression, eddy currents, frictional retardation, etc., it is as important to conserve the energy thus necessarily converted from *vis viva* into pressure, and to reconvert it into *vis viva* under conditions insuring due restoration thereof in the stationary as in the movable elements.

It will be observed that the principle of bucket action thus described may be combined with the older and usual one, by providing in the anterior portion a concave surface together with the other converging surfaces, and such a mode of operation may give improved efficiency as compared with the usual method. The density of the fluid will be more uniform, and the energy converted into pressure by centrifugal compression will be more largely conserved and utilized after due restoration of *vis viva* had. In combining the two methods as above, it will be desirable to have the greater amount of change of direction take place after the velocity of the stream has been very considerably reduced in such a contracting portion of the vane passage, as is indicated above. I do not intend to limit the scope of my invention in this respect, however.

Referring now to the more simple or elementary form of the new principle of bucket action above described, and to the movable element as a whole (comprising anterior, middle and posterior portions), the stress of the fluid upon the surfaces of the passage at various points may be favorable or unfavorable to its rotation, or neutral. A substantial preponderance of stress favorable to rotation is obtained, however, and the middle portion, whether in the form of an enlarged chamber or not, will contribute thereto, for even if this portion is not of the curved type but comprises a large reservoir or chamber, the stress of the fluid therein will be exerted upon an area of surface in the direction of rotation greater than that of the back wall, so that even if the maximum pressure which can be had at any point therein were assumed to exist at all points, a portion of the energy of the fluid would be utilized therein. The fact that zones of gradually increasing pressure must be found near the discharge end of the anterior portion, and zones of gradually diminishing pressure must be found near the delivery end of the posterior portion of the passage respectively, if the fluid's flow is to continue without choking, (that is to say, without change in the quantity flowing per second) insures a greater utilization of energy than would be found under conditions assumed in the preceding sentence.

The principle of bucket action herein described is not applicable to incompressible fluid turbines. If the attempt were made to operate such a turbine as is herein described with an inelastic, incompressible fluid, such as water, the action of the fluid in it would be essentially different from that of an elastic fluid. Water entering a properly designed contracting passage under a given velocity, will reach a maximum velocity at the point of greatest contraction, and this velocity will be that due to its hydrostatic head. Such a passage will choke the flow, (that is to say, reduce the quantity flowing per second) if the fluid enters it at this maximum velocity due to its head, and after this choking has established a reduced rate of flow, it will be found that at the orifice, or receiving end of the contracting passage, the velocity of the stream is less and its hydrostatic head greater, while as the contracted end is approached the hydrostatic head decreases and the velocity increases. On the contrary, with an elastic fluid I have found that the effect of contraction of the passage, if not carried too far, will be to convert *vis viva* into pressure without causing any choking (that is to say, reduction of quantity flowing per second). The fact stated above as to the action of water flowing through a contracting passage has been well-known and has been relied on in the design and construction of water turbine nozzles, wherein a velocity of discharge equal to that due to the hydrostatic head is desired. The reversibility of the action with water has also been understood, as shown in the discharge ends of injectors delivering a stream of feed water to a boiler wherein a pressure is maintained. I have found that the action of an elastic fluid in such a passage is entirely different as has been shown, and the function of such a passage in an elastic fluid turbine is also different.

In the accompanying drawings forming a part hereof, Fig. 23 is a vertical section on the line 23—23 of Fig. 22, looking in the direction of the arrows crossing that line. Fig. 24 is a view of the inner face of the ring carrying the forwardly projecting portions of the vane spaces, the opening to one vane space being shown and the vane space itself being developed in dotted lines. Fig. 24$^a$ represents a modified form of the figures shown in Figs. 23 and 24, showing in section one of the vane spaces in one of the rings. Fig. 24$^b$ is a section through the throat of the portion of vane space shown in Fig. 24$^a$, illustrating a round throat of a diameter equal to the depth of the vane space, and the dotted lines showing the rectangular form at the other end of the vane space.

Figure 1:
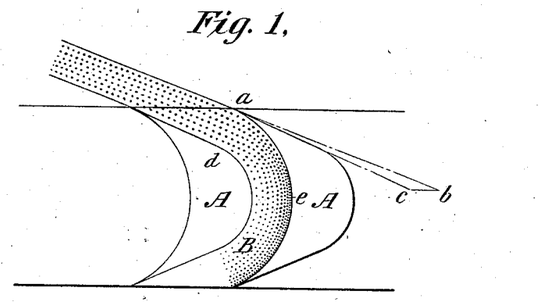
Figure 1 is a view illustrating the action of the elastic fluid in passing through a movable vane space of the form heretofore employed.

Referring particularly to Fig. 1, A A represent movable turbine buckets of the usual form, the curved vane space between them having the same cross-sectional area throughout its length. The dotted line $a\ b$ represents by its direction and length, the angle of delivery of the elastic fluid jet to the vane space and its velocity. The vane space itself, however, travels a distance represented by the line $c\ b$, and hence the line $a\ c$ indicates the angle at which the jet enters the vane space and its virtual velocity in the vane space. The wall of the vane space as far as $d$ is parallel to $a\ c$. The dots are intended to illustrate the fact that the column of fluid entering the vane space at a high velocity and uniform density, undergoes centrifugal compression as it sweeps around the concave wall $e$ and is no longer uniformly dense, a very considerable portion of vis viva being converted into pressure.

Figure 2:
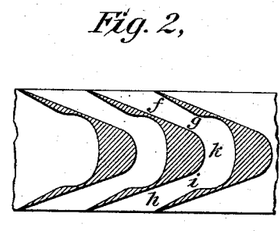
Fig. 2 is a horizontal section illustrating two vane spaces embodying my present invention.
Figure 3:
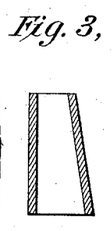
Fig. 3 is a vertical section through the central line of one of the vane spaces of Fig. 2 showing slightly diverging top and bottom walls.
Figure 4:
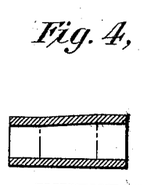
Fig. 4 is a section similar to Fig. 3, showing a different arrangement of the top and bottom walls of the vane spaces of Fig. 2.

In my improved bucket shown in Fig. 2, the anterior portion of the vane space $f$ has a diminishing cross-sectional area in the direction of flow and converts to a greater or less extent the vis viva of the elastic fluid into pressure, the degree of conversion being determined by the size of the contracted inner end or throat $g$ of this portion. The posterior portion $h$ of the vane space has an enlarging cross-sectional area, due to the divergence of all its walls, and a throat $i$. The throats $g$ and $i$ enter and leave the central enlarged space or reservoir $h$ in which the *vis viva* of the elastic fluid is still further or wholly converted into pressure during the change of direction of flow and under conditions which insure the due restoration of *vis viva* in the posterior portion. The relation between the cross-section at $g$ and $i$ must be such as not to cause choking or interruption of flow, having regard to the pressures, volumes and velocities there existing, and to the utilized and wasted energy. The stress upon the converging side walls of the anterior portion $f$ of the vane space, tends to drive the buckets forward and a similar effect is produced by the stress upon the diverging walls of the posterior portion $h$ of the vane space. In order to obtain desired cross-sectional area at the throat $i$ as compared with that of throat $g$, whether equal, greater or less, the top and bottom walls of the vane space may diverge more or less as illustrated in Figs. 3 and 4, or they may be parallel, or converge.

Figure 5:
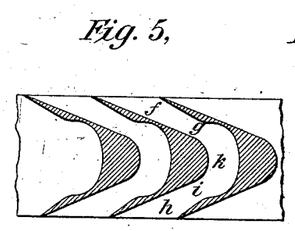
Fig. 5 is a horizontal section of my improved buckets, illustrating the same general form as in Fig. 2 but having the posterior portions of the vane spaces placed at a greater angle.
Figure 6:
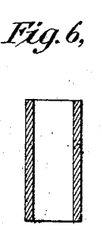
Fig. 6 is a vertical section through the central line of one of the vane spaces of Fig. 5, illustrating a parallel disposition of the top and bottom walls of the vane space.

In Fig. 5 a form of bucket similar to that of Fig. 2 is illustrated, but an enlargement of the throat $i$ is secured by giving the posterior portion of the vane space a greater angle, in which case the top and bottom walls of the vane space may be parallel, as illustrated in Fig. 6.

Figure 7:
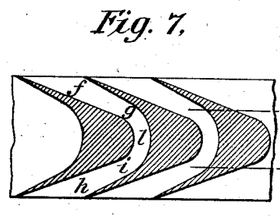
Fig. 7 is a horizontal section showing another form of my improved buckets, in which the middle portion is not in the form of an enlarged reservoir.
Figure 8:
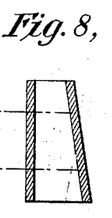
Fig. 8 is a vertical section through the central line of a vane space of Fig. 7, showing a divergence of the top and bottom walls.
Figure 9:
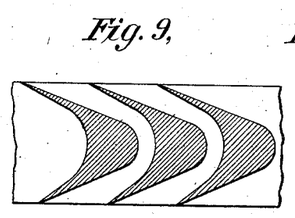
Fig. 9 is a horizontal section illustrating buckets having the same general form as those of Fig. 7 but with a greater angle in the posterior portions of the vane spaces, as in Fig. 5.
Figure 10:
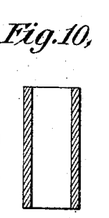
Fig. 10 is a vertical section through the central line of one of the vane spaces of Fig. 9, illustrating the parallel disposition of the top and bottom walls.

In Fig. 7 the portions $f$ and $h$ of the vane space converge and diverge, as in the form of vane space illustrated in Fig. 2, but the curved middle portion $l$ of the vane space is not enlarged in the form of a reservoir, but has a cross-sectional area gradually enlarging between the throats $g$ and $i$ which it connects. With this construction the fluid enters the middle portion (wherein it undergoes a change of direction and centrifugal compression) with a substantially uniform density and at a very much reduced velocity by reason of its passage through the anterior portion, and as centrifugal compression is as the square of the velocity, the density of the fluid at $i$ will be more uniform and its remaining energy will be more surely utilized thereafter than would otherwise be the case. This reduced velocity also results in a very much reduced tendency to eddy currents and frictional retardation. With such a construction as is shown in Fig. 7, the top and bottom walls of the vane space may diverge as illustrated in Fig. 8, or if a greater angle is given to the posterior portion of the vane space, as is illustrated in Fig. 9, the top and bottom walls may be parallel, as shown by Fig. 10. Any desired variation in the cross-section of the passage from point to point may be obtained either by varying the angle of the anterior and posterior portions, or by varying the depth or vertical dimension at such points. I have shown in these figures a cross-sectional area at the throat $i$ greater than at the throat $g$, but it may be desirable under certain conditions to have the throat $i$ of smaller or equal cross-section with reference to the throat $g$.

Figure 11:
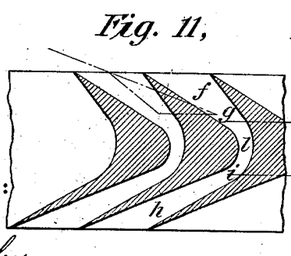
Fig. 11 is a horizontal section showing buckets of the general character of those of Fig. 7 but of unsymmetrical form.
Figure 12:
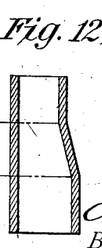
Fig. 12 is a vertical section through the central line of one of the vane spaces of Fig. 11.

In Fig. 11 a form of bucket similar to that of Fig. 7 is illustrated, but in this figure the vane space is made unsymmetrical, the posterior portion of the vane space having a more obtuse angle than the receiving portion. It is desirable, of course, to discharge the fluid as nearly parallel to the plane of rotation as possible, for the stress upon the diverging walls of the posterior section thus gives a larger component in the direction of rotation. A greater speed of the buckets relative to the speed of the elastic fluid is also illustrated by dotted lines forming a triangle. The unsymmetrical form of the buckets adapts the turbine for a reversal of its action, *i. e.* for running it backward with power applied to its shaft when it may be used for compressing an elastic fluid, such as air. To give the throat $i$ a greater cross-sectional area than the throat $g$, the top and bottom walls of the vane space may be diverged, as illustrated in Fig. 12.

Figure 13:
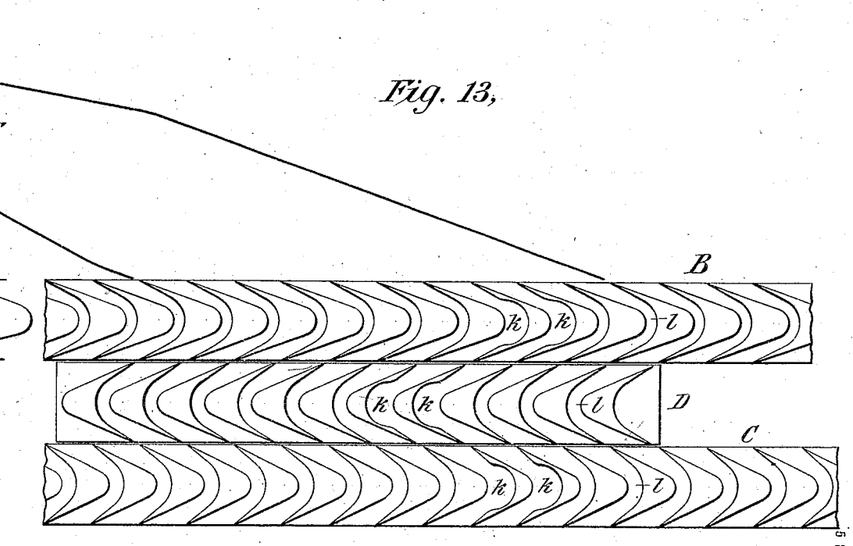
Fig. 13 is a horizontal development of the nozzle, and a part of the buckets of a turbine having two sets of movable buckets and one set of intermediate stationary buckets involving my invention.
Figure 14:
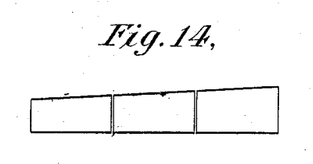
Fig. 14 is a view illustrating the top and bottom walls of one line of vane spaces in the turbine of Fig. 13.

In Fig. 13 is illustrated a compound turbine having two sets of movable buckets B and C mounted upon the same shaft and rotating in the same direction, and a set of intermediate stationary buckets D. Vane spaces with the central reservoir K, and others with curved middle portions $l$, are illustrated both in the movable and stationary vanes, to show that either form of construction may be employed. The delivery nozzle E is one having diverging walls so as to convert a considerable amount of pressure into *vis viva*. The figure is intended to illustrate a delivery nozzle which does not produce a maximum conversion of pressure into *vis viva*, the remaining pressure being converted into *vis viva* in the vane spaces of the turbine. Since the vane spaces of each set as shown in Fig. 13 have the same angle at their receiving and discharging ends, enlargement of cross-sectional area at various points may be had by varying the vertical dimension or bucket depth, and this may be had by a divergence of the top and bottom walls of the vane spaces, as illustrated in Fig. 14.

My improved buckets are applicable to compound turbines having any number of movable or stationary elements, or to such turbines of the jet type in which the fluid is passed through the same set of buckets two or more times in succession, or to turbines of the outward and inward flow types, or any other types.

Figure 15:
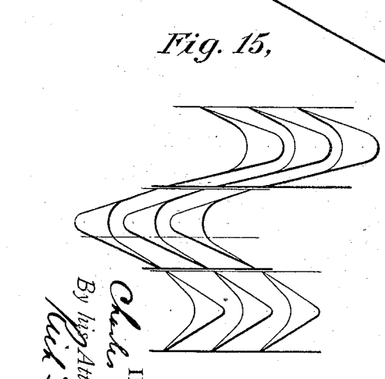
Fig. 15 is a view similar to that of Fig. 13, but with the nozzle omitted, illustrating a compound turbine in which the posterior portions of the first set of movable buckets are of uniform cross-sectional area so as to maintain the pressure up to the point of discharge.
Figure 16:
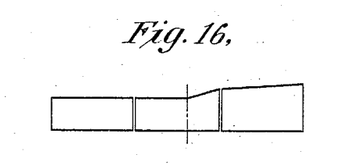
Fig. 16 is a view illustrating the top and bottom walls of one line of vane spaces in the turbine of Fig. 15.

In Figs. 15 and 16 there is illustrated a construction in which the posterior portions of the first set of movable vane spaces have the same cross-sectional area throughout their length, so that the pressure produced by the converging anterior portions of the vane spaces is conserved and the elastic fluid is discharged under this pressure into the stationary intermediate vane spaces which have parallel walls in their receiving portions, and have their discharging portions provided with walls having a sufficient angle of divergence to convert the pressure wholly or largely into *vis viva* before the elastic fluid is discharged into the vane spaces of the second movable set of buckets. This feature of substantially maintaining the same pressure in all parts of the posterior portion, may also be employed where the vane space is provided with an enlargement or reservoir at its central portion. I do not consider the construction illustrated in Figs. 15 and 16 as effective as that in which there is a reconversion of pressure into *vis viva* in the posterior portions of the movable vane spaces, but it illustrates one of the ways of applying my invention.

Figure 17:
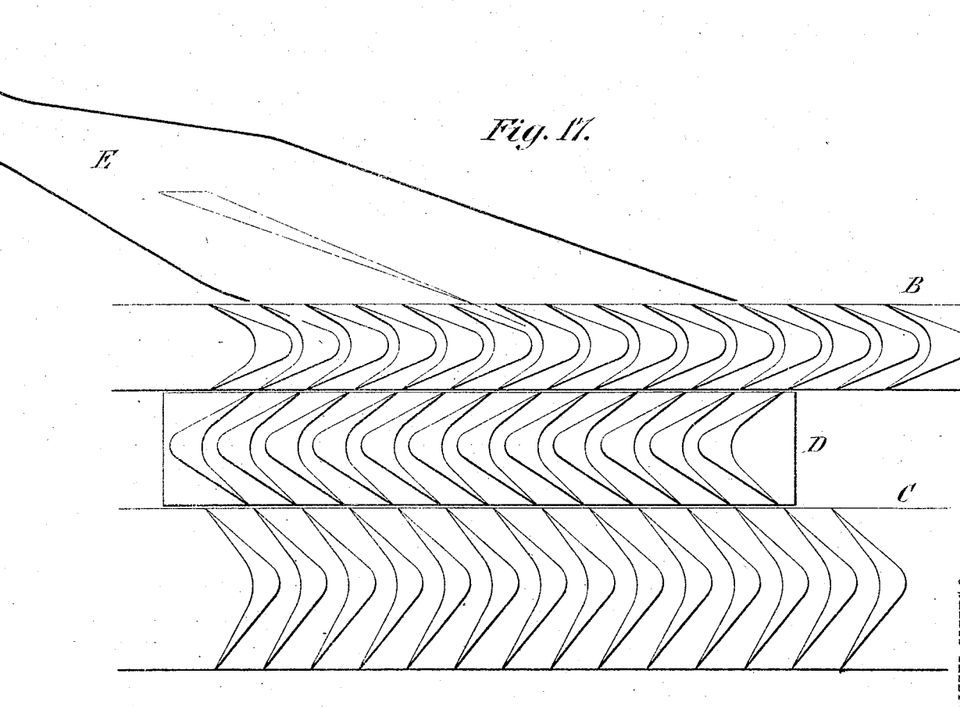
Fig. 17 is a view similar to Fig. 13, illustrating a more complete conversion of the pressure in the delivery nozzle and with the buckets or vane spaces correspondingly proportioned.
Figure 18:
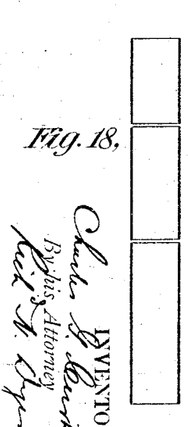
Fig. 18 is a view illustrating the top and bottom walls through one line of vane spaces of Fig. 17.

In Figs. 17 and 18 there is illustrated a turbine similar to that of Fig. 13, in which, however, the delivery nozzle is proportioned to convert all or practically all of the pressure into *vis viva* and the buckets are given a progressively greater angle so as to provide throats of progressively greater size and take care of the reduced velocity of the elastic fluid relative to the speed of the buckets, and provision is made for giving increased cross-sectional areas at various points through the working passage so as to provide for the reduction in the velocity of flow caused by the action in the moving buckets.

Figures 19, 20, 21:
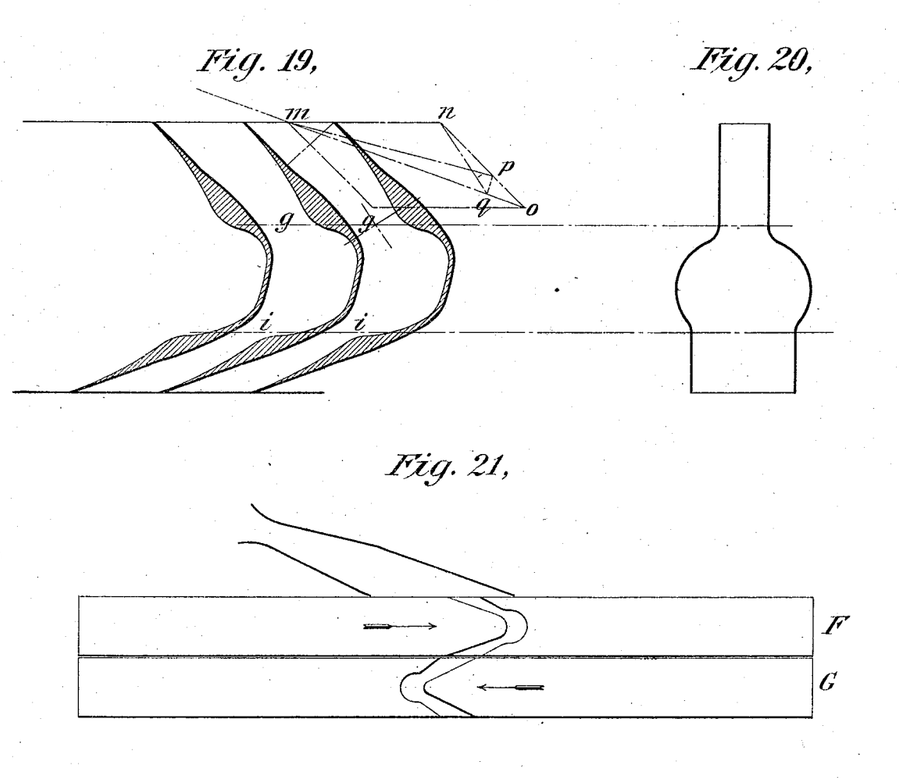
Fig. 19 is a horizontal section illustrating two of my improved vane spaces of a modified form, and adapted to a relatively high bucket velocity as compared to the velocity of the fluid.
Fig. 20 is a view illustrating the top and bottom walls of one of the vane spaces of Fig. 19.
Fig. 21 is a view illustrating the application of my improved vane spaces to the case of a turbine comprising two sets of buckets moving in opposite directions, the first set of buckets discharging directly into the second set of buckets.

In Fig. 19 vane spaces are illustrated having a central reservoir and unsymmetrical in form in that the posterior portions of the vane spaces have a sharper or less angle than the receiving portions. Such an apparatus is adapted for reversal for the compression of air or other elastic fluid. This figure also illustrates a curving of the converging and diverging front and rear walls of the receiving and discharging portions of the vane passage so as to correspond with the actual movement of the steam particles in the vane spaces relative to the movement of the vane spaces themselves, this complex action being analyzed by the diagram shown in dotted lines. The elastic fluid enters the vane space with the velocity $m\ o$. The velocity of the bucket is $m\ n$. Therefore $n\ o$ represents the virtual angle at which the fluid enters the vane space. While the fluid passes through the anterior portion of the passage its velocity becomes reduced and when it reaches the throat $g$ its velocity, for example, will be represented by the length $m\ q$. The virtual angle of flow will therefore be represented by the line $n\ q$ which is parallel to the axis of the throat $g$. Between the receiving end of the anterior portion and its throat the virtual angle of inflow will gradually change so that the true theoretical shape of this portion should be more or less curved, depending upon the change in velocity of the fluid produced by the contracting passage, and also upon the relative velocities of the fluid and that of the movable buckets. Similarly the posterior portions should theoretically be given a curved form, as shown in Fig. 19, the change of direction being worked out on similar principles. The construction illustrated by this figure may be used without the central reservoir $k$ and with the curved middle portion of the vane space having parallel front and rear walls. It can also be used with a construction wherein the posterior portion of the vane space has parallel front and rear walls. Due to the sharper or less angle of the posterior portions of the vane spaces, a considerable increase in the depth or vertical dimension in the middle portions of the vane spaces is necessary, as illustrated in Fig. 20, in order that the throat $i$ shall have the necessary cross-sectional area relative to that of the throat $g$.

The principles herein described I have also applied to the operation of compressing air or other elastic fluid, or imparting a velocity to a body of such fluid, with the same relative improvement in efficiency as compared with the apparatus described in my pending application Serial No. 601,606, filed August 4, 1896. By rotating a series of buckets, employing the principles herein shown, in the direction opposite to that in which it would turn if used as a motor and at a proper speed relative to the amount of compression or the velocity of flow which it is desired to obtain, the effect of these buckets will be to draw the air or other elastic fluid into their anterior portions, producing compression of the fluid therein by the gradually diminishing cross-section of these portions and then while such fluid is under increased pressure and reduced velocity, changing its direction of flow as desired and delivering it either by means of parallel or diverging walled posterior portions which serve to convert pressure into velocity, to the stationary or receiving portions of the apparatus wherein the *vis viva* may either be preserved as velocity or converted into the required pressure as desired.

In Fig. 21 two turbine wheels F and G are illustrated rotating in opposite directions, the vane spaces of the wheel F discharging directly into the vane spaces of the wheel G. This figure simply illustrates the fact that my improved principle of bucket action is applicable to turbines of this character.

Figure 22:
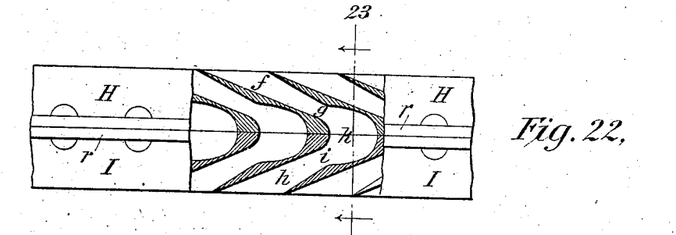
Fig. 22 is a top view of a portion of the turbine wheel partly broken away to illustrate two of the vane spaces and showing a method of construction by which my improved vane spaces can be cheaply and effectively constructed.
Figures 23, 24, 24A, 24B:
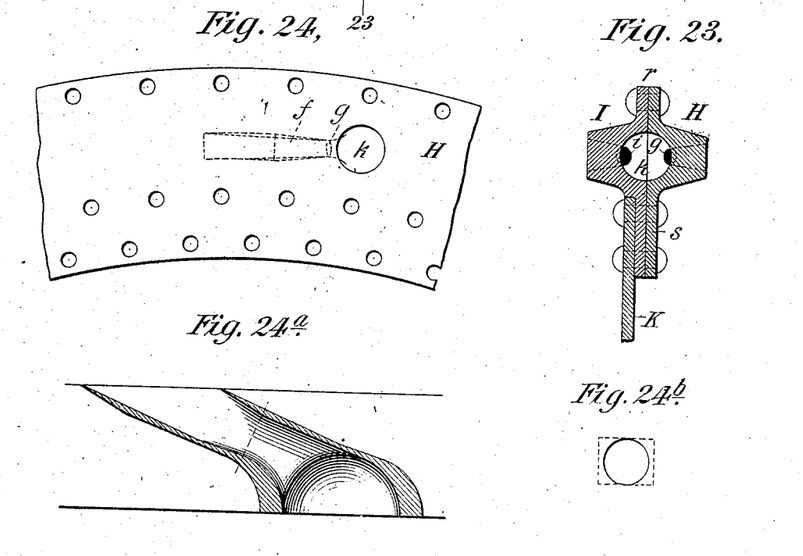
Figures 25, 26:
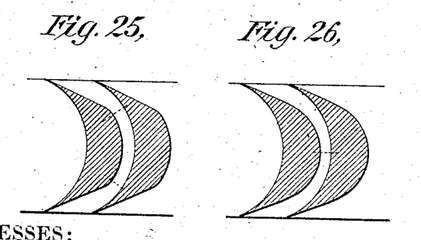
Figs. 25, 26 and 27 are views illustrating the principle of my invention as applied to a bucket of the present centrifugal type.
Figure 27:
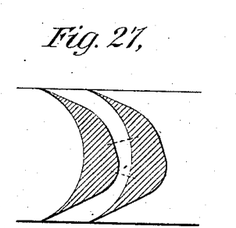

In Figs. 22, 23 and 24 a desirable construction for my improved form of bucket is illustrated. H and I are two steel rings which are riveted together and may be mounted upon any portion of the turbine wheel, for example, the disk K or one section of it, by means of the flanges $r$ and $s$. These steel rings are cut with suitable tools so as to form the vane spaces, one part of the vane spaces being formed in each ring and the vane spaces being completed by the joining of the rings. With this construction the central reservoir $k$, when employed, may be formed partly by radial enlargement of the passage. The construction avoids the necessity for the use of outer and inner rings between which the buckets are secured, as employed by me in former constructions.

In Fig. 24 only one of the openings through the ring H is illustrated in order to avoid confusion.

It is evident as already indicated, that I also intend to use my improved buckets and principle of bucket action, both for compressing air or other elastic fluid and for imparting velocity to them, by a reversal of the operation, and I wish it understood that this reversal of the operation is included in the claims which I make herein to the present invention.

It will be observed that the methods herein described as applicable to a turbine using an elastic fluid, is also applicable whenever and wherever the direction of flow of an elastic fluid moving under a considerable velocity due to its *vis viva*, is to be changed. I intend to apply for a patent or patents on its use in connection with other kinds of apparatus.

The method herein described is not claimed herein but will be made the subject of a separate application for patent.

What I claim is:

1. In an elastic fluid turbine, the combination with an element having movable vane spaces which diminish in cross section in the direction of flow of the elastic fluid in their receiving portions and increase in cross section in the direction of flow of the elastic fluid in their discharging portions, of an expansion nozzle coöperating therewith, substantially as set forth.

2. In an elastic fluid turbine, the combination with an element having movable vane spaces having a convergent receiving portion, a divergent discharging portion, and a connecting portion of larger cross-sectional area, of an expansion nozzle coöperating with such movable vane spaces, substantially as set forth.

3. In an elastic fluid turbine, an element having a movable or stationary vane space which receives and discharges the elastic fluid in different directions, provided with a receiving portion whose cross-sectional area diminishes in the direction of flow, and an enlarged chamber at the point where the vane space changes its direction, substantially as set forth.

4. In an elastic fluid turbine, an element having a movable or stationary vane passage which receives and discharges the elastic fluid in different directions, provided with a receiving portion whose cross-sectional area diminishes in the direction of flow, a discharging portion whose cross-sectional area increases in the direction of flow, and an enlarged chamber connecting said portions, substantially as set forth.

5. In combination with two bucket wheels of the axial flow type, a passage for working fluid interposed between said wheels having its cross sectional area gradually decreasing and then gradually increasing in the direction of flow; the inlet extremity of said passage being equal in radial width to the outlet of one wheel and the outlet extremity of said passage being equal in radial width to the inlet of the other wheel.

6. An elastic fluid turbine having a wheel provided with buckets, each of said buckets tapering toward the outlet, and an expansion nozzle arranged to deliver the elastic fluid to the inlets of the buckets.

7. In an elastic fluid turbine, an element having a vane space which has an enlarged cross-sectional area intermediate its receiving and discharging ends, substantially as set forth.

8. In an elastic fluid turbine, an element having a movable vane space having an enlarged cross-sectional area intermediate its receiving and discharging ends, substantially as set forth.

9. In an elastic fluid turbine, an element having a movable vane space having its receiving and discharging ends arranged to receive and discharge the elastic fluid at forward and rearward angles respectively, such vane space having between its ends an enlarged chamber in which the *vis viva* of the elastic fluid or a portion thereof is converted into pressure, substantially as set forth.

10. In an elastic fluid turbine, an element having a movable vane space having its receiving and discharging ends arranged to receive and discharge the elastic fluid at forward and rearward angles respectively, such vane space having between its ends an enlarged chamber in which the *vis viva* of the elastic fluid is wholly or largely converted into pressure, substantially as set forth.

11. In an elastic fluid turbine, an element having a vane space receiving and discharging the elastic fluid in different directions and having an enlarged chamber at the point where the vane space changes its direction whereby a fall in velocity will be produced, substantially as set forth.

This specification signed and witnessed this 13th day of Jany. 1898.

CHARLES G. CURTIS.

Witnesses:
LUCIUS C. RYCE,
EUGENE CONRAN.

Copies of this patent may be obtained for five cents each, by addressing the "Commissioner of Patents, Washington, D. C."